A. O. ESPE.
TRACTION ENGINE.
APPLICATION FILED MAR. 25, 1909.
944,236.
Patented Dec. 21, 1909.
2 SHEETS—SHEET 1.
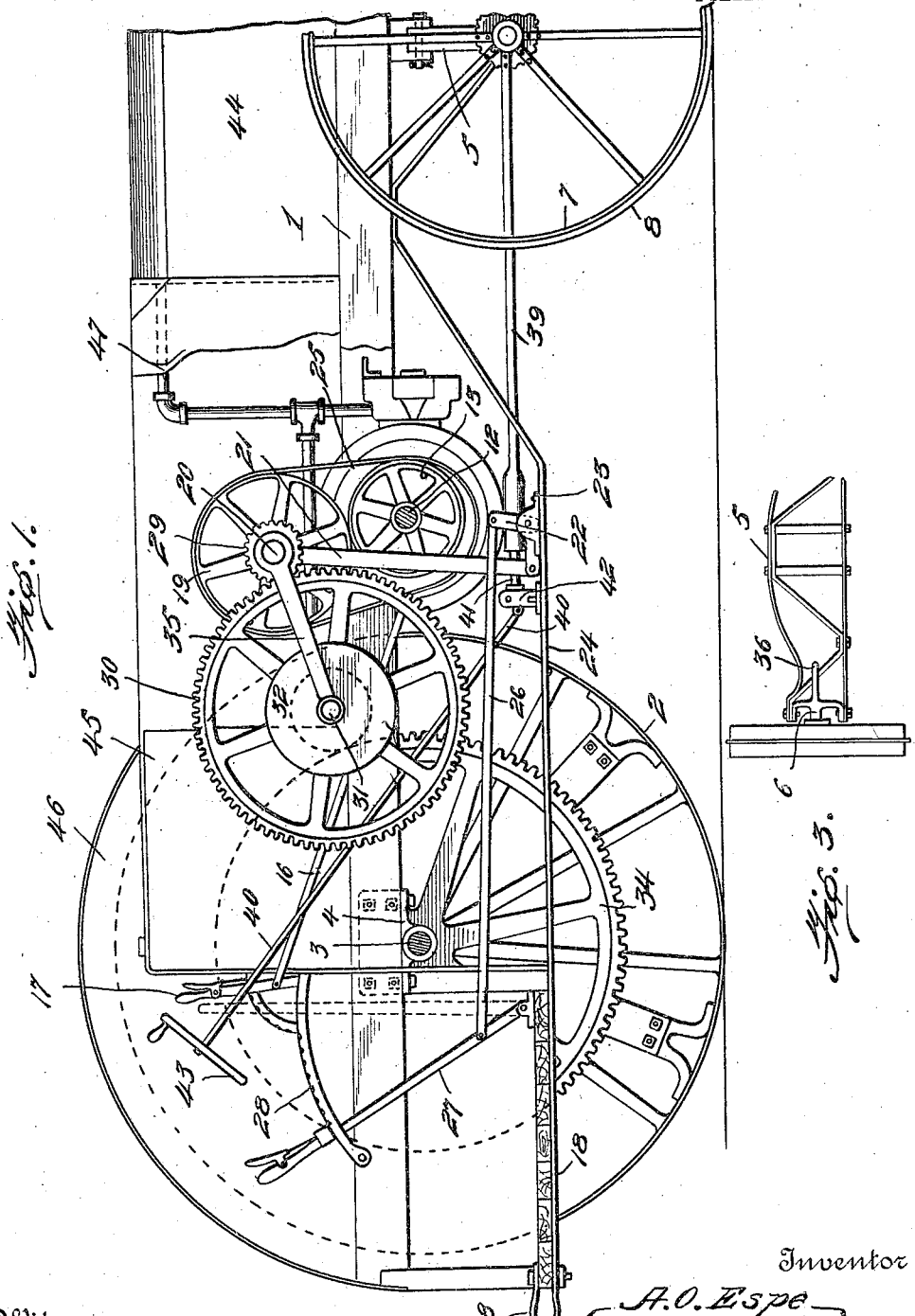
Witnesses
Inventor
A. O. Espe
by H. B. Willson & Co.
Attorneys

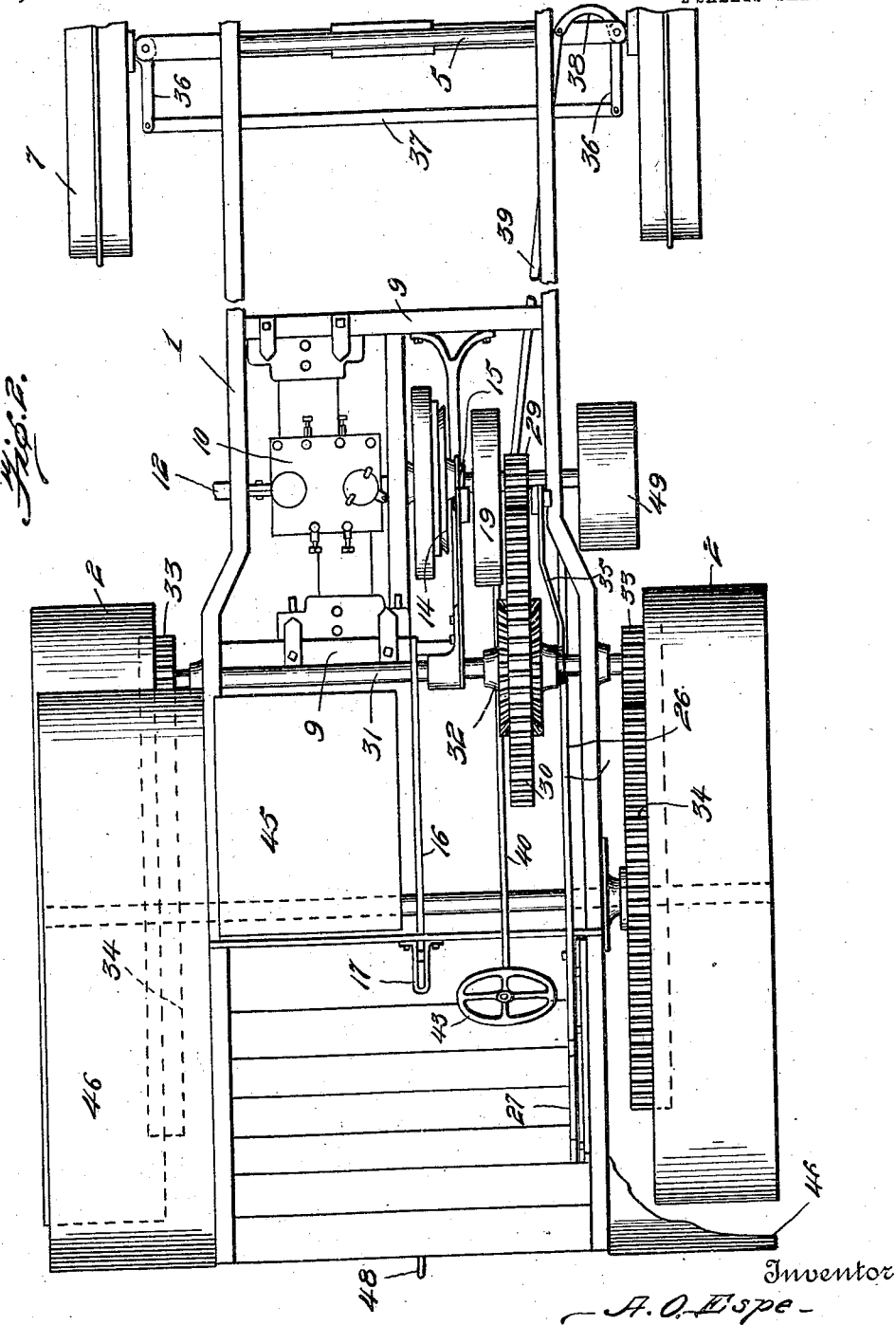

UNITED STATES PATENT OFFICE.

ALBERT O. ESPE, OF CROOKSTON, MINNESOTA, ASSIGNOR TO UNIVERSAL TRACTOR COMPANY, OF CROOKSTON, MINNESOTA, A CORPORATION.

TRACTION-ENGINE.

944,236.      Specification of Letters Patent.      Patented Dec. 21, 1909.

Application filed March 25, 1909. Serial No. 485,746.

*To all whom it may concern:*

Be it known that I, ALBERT O. ESPE, a citizen of the United States, residing at Crookston, in the county of Polk and State of Minnesota, have invented certain new and useful Improvements in Traction-Engines; and I do declare the following to be a full, clear, and exact description of the invention, such as will enable others skilled in the art to which it appertains to make and use the same.

This invention relates to improvements in traction engines and particularly the driving mechanism of the engine.

The object of the invention is to provide an improved construction of driving mechanism having means whereby the same may be quickly and easily reversed to propel the engine backwardly.

A further object of the invention is to provide an improved means for throwing the driving mechanism into and out of operation.

With the foregoing and other objects in view, the invention consists of certain novel features of construction, combination and arrangement of parts as will be more fully described and particularly pointed out in the appended claims.

Figure 1 is a side elevation, partly in vertical longitudinal section, of this improved engine; Fig. 2 is a plan view thereof; Fig. 3 is a detail view of one of the front steering wheels and a portion of the bolster.

Referring more particularly to the drawings, 1 denotes the frame of the engine which is supported at its rear end upon driving wheels 2 which are fixedly mounted on the axle 3 revolubly mounted in bearings 4 on the frame 1, as shown. The front end of the frame has secured thereto a truss frame or bolster 5 in the outer ends of which are pivotally mounted steering axles 6 with which are engaged the front steering wheels 7 of the engine. The steering wheels 7 have preferably formed thereon a centrally disposed annular rib 8 to prevent skidding or slipping of the machine.

Supported on cross pieces 9 of the frame at one side of the same is a motor 10 which may be of any suitable construction but which is here shown and is preferably in the form of a gasolene engine. On the shaft 12 of the engine is loosely mounted a drive pulley 13 which is adapted to be locked into engagement with the shaft by a friction clutch 14 operated by a shifting device 15 which is connected by an operating rod 16 to a hand lever 17 arranged on the frame in convenient reach of the operator standing on the rear platform 18 of the engine.

Engaged with the drive pulley 13 of the engine is a reversing mechanism comprising a friction pulley 19 which is revolubly mounted on a short shaft 20 journaled in suitable bearings in the upper ends of supporting bars 21, the lower ends of which are secured to a crank shaft 22, arranged in suitable bearings 23 on a hanger frame 24 secured to the main frame 1 of the engine. Around the drive pulley 13 and the friction or reversing pulley 19 is arranged a belt 25. By means of the crank shaft 22, the pulley supporting bars 21 are raised or lowered thereby disengaging or engaging the friction pulley 19 with the drive pulley 13. When the supporting bars are lowered, the friction pulley will be engaged with the drive pulley and will be turned in one direction by its frictional engagement with the drive pulley and when the supporting bars are raised and the pulley 19 disengaged from the drive pulley, the belt 25 will be tightened and the pulley 19 will be driven thereby in an opposite direction. The crank shaft 22 will be operated to raise and lower the supporting bars 21 in any suitable manner, but is here shown as having connected therewith an operating rod 26 which is connected at its outer end with a hand lever 27, suitably mounted on the platform 18 and in engagement with a segmental rack 28 whereby the lever and the crank shaft may be held in their adjusted position.

On the shaft 20 is fixedly mounted a spur gear pinion 29 which is in operative engagement with a power transmitting gear 30 which is engaged with a driving shaft 31 through compensating gears 32 mounted on said shafts. On the outer ends of the shaft 31 are fixedly mounted spur gear pinions 33 said pinions 33 being in operative engagement with driving gears 34 rigidly secured to the rear drive and supporting wheels 2 of the engine. The pinion 29 on the shaft 20 is held in operative engagement with the power transmitting gear 30 by means of straps or bars 35 which are loosely connected at one end to the shaft 20 and at their opposite end to the shaft 31.

The engine is steered by means of the short front axles 6 which are provided with rearwardly projecting crank arms 36 connected by a connecting rod 37 whereby the axles are moved together or in unison and to the axle at one side of the machine is secured a curved crank arm 38 which is connected by an operating rod 39 to a steering shaft 40, the forward end of which has a universal joint connection with and adjusting bar 41 mounted in suitable bearings 42 in the hanger frame 24 of the machine. On the rear end of the steering shaft 40 is mounted a hand wheel 43 whereby the shaft may be revolved and the threaded adjusting rod turned in one direction or the other thereby retracting or projecting the operating rod 39 to turn the steering wheels in one direction or the other.

On the front end of the supporting frame 1 is preferably arranged a water tank 44 while on the rear portion of the frame is arranged a gasolene tank 45, said tanks being suitably connected to the engine 10. On the frame 1 over the rear driving wheels is preferably arranged mud guards 46 and the engine and operating gears are preferably covered by a hood 47. The rear platform 18 is attached to and supported by the hanger frame 24 and to the rear portion of said platform and frame is secured a loop or eye 48.

On one or both ends of the engine shaft 12 may be mounted belt pulleys 49 by means of which the engine may be employed for operating machinery. When the engine is so employed, the friction pulley 19 will be disengaged from the drive pulley 13 but will not be removed a sufficient distance therefrom to tighten the belt 25 so that the propelling mechanism will be entirely disconnected from the engine shaft. The friction pulley 19 is held in its various adjusted positions by means of the notches arranged in the rack bar 28 and engaged by the pawl of the lever 27, as hereinbefore described.

From the foregoing description, taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of the invention as defined in the appended claims.

Having thus described my invention, what I claim as new is:

1. In a traction engine, a motor, a drive shaft operated by said motor, a drive pulley loosely mounted on said shaft, a clutch mechanism to lock said pulley to the shaft, a crank shaft mounted in the frame of the engine, pulley supporting bars connected to said crank shaft, a friction pulley revolubly mounted in the upper ends of said supporting bars and adapted to be moved thereby into and out of frictional engagement with said drive pulley, a belt to connect said friction pulley with said drive pulley when out of frictional engagement therewith, an operating rod and lever connected to said crank shaft, a spur gear pinion operated by said friction pulley, a drive shaft, a compensating gear mounted on said shaft, a power transmitting gear connected to said shaft through said compensating gear, said power transmitting gear having an operative engagement with the pinion of said friction pulley, engine supporting and driving wheels, driving gears fixedly secured to said wheels, and pinions on the outer ends of said drive shaft to engage the drive gears on said driving and supporting wheels whereby the engine is propelled in a forward or backward direction.

2. In a traction engine, a motor, a drive shaft operated by said motor, a drive pulley loosely mounted on said shaft, a crank shaft having spaced uprights connected therewith, a friction pulley mounted in the free ends of said uprights, a belt arranged around said pulleys, an operating lever connected to actuate said crank shaft for raising and lowering said friction pulley to reverse the direction of the engine.

In testimony whereof I have hereunto set my hand in presence of two subscribing witnesses.

ALBERT O. ESPE.

Witnesses:
MYRA M. KASSER,
ESTELLE MONROE.